UNITED STATES PATENT OFFICE.

CARL ROSENZWEIG, OF VIENNA, AUSTRIA-HUNGARY.

WHITE ENAMEL.

995,724.      Specification of Letters Patent.     Patented June 20, 1911.

No Drawing.     Application filed April 2, 1909. Serial No. 487,479.

*To all whom it may concern:*

Be it known that I, CARL ROSENZWEIG, partner of the firm Landau & Co., of Elisabethstrasse 22, Vienna I., a subject of the Emperor of Austria-Hungary, and a resident of Elisabethstrasse 22, Vienna I., in the Empire of Austria-Hungary, have invented Pure White Enamel of Increased Covering Power; and I do hereby declare the following to be a full, clear, and exact description of the invention, such as will enable others skilled in the art to which it appertains to make and use the same.

The chemically pure oxids of tin, zirconium, titanium, which have been used up to the present for the purpose of manufacturing pure white enamel, do not completely meet the demands which are made on means for clouding glaze in practice with regard to stability in a state of incandescence, covering power, resistance to acids and cheapness.

The object of the present invention is a pure enamel of great covering power for glazed goods of all kinds.

Said enamel consists according to the invention of a transparent or translucent glazing mass with an addition of silica compounds of metallic oxids of the rare earths which are white at glowing temperature.

Pure white silicates preferred for the production of a pure enamel are the silicates of zirconium, thorium, beryllium, lanthanium and yttrium. It is already known to use in the place of chemically pure oxid of zirconium minerals containing zirconium, but only for producing cheap enamels which are not white in color and of inferior value and in which the minerals are used in a state of incomplete purification. Heretofore it has not been known that also the silicates of the oxids of the rare earth metals are gifted with a high degree of covering power and that by means of pure silicates a pure white enamel may be obtained, which enamel is cheaper and more stable than the enamel containing pure zirconium oxid.

When silicates were employed heretofore it was solely a matter of those which appeared particularly suitable for manufacturing the glazing mass, which follows from their having been added to the goods to be enameled. The employment of silicic acid compounds of rare metallic oxids according to the present invention as covering substance for the purpose of manufacturing white enamels was not known heretofore.

The silicates increase the stability of the enamels when incandescent and their covering power because the already combined silicate compound with its higher melting point no longer reacts chemically with the melting mass already containing much silicic acid and therefore remains in action as a clouding and covering agent. This is proven by the fact that a definite quantity of silicate possesses a greater covering power than an equal quantity of pure oxid. The silicates increase further the resistance to acids since the silica compounds of the oxids are attacked with more difficulty by acids than the oxids themselves. Consequently, the silicates employed according to my invention have the advantage, as compared with known bodies, of greater covering power in consequence of their insolubility in the glazing mass, and of increasing materially the resistance to acids as compared with oxids. In both properties is to be found the technical advantage as compared with employing oxid of zirconium. The economic advantage follows therefrom at once, as apart from their greater efficaciousness, the silicates are considerably cheaper to manufacture than chemically pure oxids, particularly oxid of zirconium, because said silicates may be obtained from cheap by-products in the manufacture of thorium compounds or from cheap raw products. For instance the silicate of zirconium which occurs in nature is liberated only by simple mechanical or chemical methods from coloring admixtures and the remaining silicate of pure white color may be taken into use without further treatment.

The pure white silicates freed from coloring matter or mixtures of said silicates are added preferably to the molten glazing mass so that they act only as clouding and covering agents without being dissolved.

What I claim as my invention and desire to secure by Letters Patent is:

1. An enamel composed of silicates of the rare earth metals which are freed from coloring admixtures and are white at the temperature at which they are caused to glow, substantially as described.

2. An enamel composed of a glazing mass and a silica compound of a rare earth metallic oxid which silicate is white at the temperature at which it is caused to glow, substantially as described.

3. An enamel composed of glazing mass and of a silica compound of zirconium substantially as described.

In testimony whereof I have signed my name to this specification in the presence of two subscribing witnesses.

CARL ROSENZWEIG.

Witnesses:
CHEMNITZ H. SCHILLING,
AUGUST FUGGER.